(12) United States Patent
Burkhard et al.

(10) Patent No.: US 11,767,050 B2
(45) Date of Patent: Sep. 26, 2023

(54) PLASTIC INJECTED RIGID SPLINED SHAFT CONNECTION

(71) Applicant: Steering Solutions IP Holding Corporation, Saginaw, MI (US)

(72) Inventors: Terry E. Burkhard, Bay City, MI (US); David E. Moore, Grand Blanc, MI (US); Kyle R. Mazure, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 239 days.

(21) Appl. No.: 17/160,393

(22) Filed: Jan. 28, 2021

(65) Prior Publication Data

US 2021/0339789 A1    Nov. 4, 2021

Related U.S. Application Data

(60) Provisional application No. 63/018,435, filed on Apr. 30, 2020.

(51) Int. Cl.
| | | |
|---|---|---|
| *B62D 1/16* | (2006.01) | |
| *F16D 1/027* | (2006.01) | |
| *B29C 45/14* | (2006.01) | |
| *B29L 31/00* | (2006.01) | |

(52) U.S. Cl.
CPC .......... *B62D 1/16* (2013.01); *B29C 45/14491* (2013.01); *F16D 1/027* (2013.01); *B29L 2031/75* (2013.01); *F16D 2300/12* (2013.01)

(58) Field of Classification Search
CPC ...... B62D 1/16; B62D 1/20; B29C 45/14491; F16D 1/027; F16D 2300/12
See application file for complete search history.

(56) References Cited

U.S. PATENT DOCUMENTS

| | | | | |
|---|---|---|---|---|
| 4,977,793 | A * | 12/1990 | Husted | B29C 45/14491 123/90.6 |
| 5,228,720 | A * | 7/1993 | Sato | F16D 1/068 403/359.2 |
| 5,640,884 | A * | 6/1997 | Fujiu | B62D 1/192 74/492 |
| 5,672,111 | A * | 9/1997 | Schremmer | F16D 1/10 464/180 |
| 6,026,704 | A * | 2/2000 | Shibata | F16D 3/06 74/496 |

(Continued)

*Primary Examiner* — Frank B Vanaman
(74) *Attorney, Agent, or Firm* — Dickinson Wright PLLC (57) ABSTRACT

An intermediate shaft assembly and method of assembly thereof. The intermediate shaft assembly includes a first shaft extending between a first end and a second end. The first shaft has a tubular wall portion with an inner surface bounding a hollow bore extending into said first end. The inner surface has a plurality of female splines and the tubular wall portion has at least one through opening. A second shaft extends between a coupling end and a connection end. The connection end has an outer surface sized for a clearance fit within the hollow bore. The outer surface has a plurality of male splines configured for an interdigitated fit with the female splines. The interdigitated fit establishes a clearance gap between the male splines and the female spines. A polymeric material at least partially fills the clearance gap and extends into the at least one through opening.

17 Claims, 4 Drawing Sheets

(56) References Cited

U.S. PATENT DOCUMENTS

| | | | | |
|---|---|---|---|---|
| 6,223,619 B1* | 5/2001 | Shibata | ............... | B62D 1/192 |
| | | | | 188/371 |
| 9,157,482 B2* | 10/2015 | Vasicek | ............... | B62D 1/20 |
| 2015/0210309 A1* | 7/2015 | Kurokawa | ............... | F16D 3/06 |
| | | | | 464/181 |
| 2015/0275946 A1* | 10/2015 | Ishizaki | ............... | F16D 1/06 |
| | | | | 403/359.1 |
| 2017/0036690 A1* | 2/2017 | Jäger | ............... | F16D 3/06 |
| 2017/0232995 A1* | 8/2017 | Brzezinski | ............... | F16D 3/06 |
| | | | | 74/493 |

\* cited by examiner

PLASTIC INJECTED RIGID SPLINED SHAFT CONNECTION

CROSS-REFERENCE TO RELATED APPLICATIONS

This application claims the benefit of U.S. Provisional Application Ser. No. 63/018,435, filed Apr. 30, 2020, which is incorporated herein by reference in its entirety.

FIELD OF THE INVENTION

The present disclosure generally relates to intermediate shaft assemblies for motor vehicles, and more specifically, to an intermediate shaft assembly for a vehicle having coaxial shafts connected to one another.

BACKGROUND OF THE INVENTION

Intermediate shafts (I-shafts) are designed to be a component of torque transfer from a steering column to a steering gear. Some known I-shafts have coaxial shafts connected to another, with one shaft being inserted into a bore of the other shaft. In order to ensure the shafts are fixed together, an interference fit can be provided between the mating shafts. However, an interference fit can result in high scrap rates due in part to the high compressive forces needed to join the shafts, which ultimately tends to damage at least one of the shafts. Some efforts to counteract scrap include providing the shafts from heavier, thicker material, but this comes with increased material cost and weight, while also requiring additional space to accommodate the increased size of the parts.

Otherwise, a line-to-line fit can be provided between the shafts to avoid the need for high compression forces to join the shafts together, with tightly controlled tolerances needing to be provided to attain the line-to-line fit, with the fixation of the shafts to one another being supplemented by secondary fasteners, such as bolts or screws, to ensure the shafts remain fixed together, as intended. However, this too comes with an increased cost as a result of having to maintain tight tolerances for each of the shafts, and further by having to not only provide the secondary fasteners, but also the additional processes of having to form fastener openings and fix the fasteners in the openings at separate process stations. Further, the secondary fasteners also tend to protrude outwardly from the shafts, thereby requiring additional space in use, which is contrary to optimal design and costly. In addition, regardless of the aforementioned fixation mechanism, any clearance remaining between the shafts, such as where a clearance is established at an end of one of the shafts, can provide a location for the ingress of contamination, thereby providing a potential source for corrosion.

SUMMARY OF THE INVENTION

It is an object of the present disclosure to provide an intermediate shaft (I-shaft) that overcomes at least some of the drawbacks discussed above with known I-shafts.

It is a further object of the present disclosure to provide an I-shaft that is compact, lightweight, robust and durable in use, and economical in manufacture and assembly.

It is a further object of the present disclosure to provide an I-shaft that optimizes the number of components required in manufacture/assembly.

It is a further object of the present disclosure to provide an I-shaft that optimizes the number of operations at different work stations required in manufacture/assembly.

It is a further object of the present disclosure to provide an I-shaft that optimizes the number of work stations required in manufacture/assembly.

It is a further object of the present disclosure to provide an I-shaft that minimizes the amount of scrap in manufacture and assembly.

It is a further object of the present disclosure to provide an I-shaft that minimizes the risk for the ingress of contamination.

According to the objects, features and advantages, an aspect of the present disclosure provides an I-shaft assembly. The I-shaft assembly includes a first shaft extending along an axis between a first end and a second end. The first shaft has a first tubular wall portion with an inner surface bounding a hollow bore extending into the first end. The inner surface has a plurality of radially inwardly extending female splines extending generally parallel to the axis, and the first tubular wall portion has at least one through opening. The I-shaft assembly further includes a second shaft extending along an axis between a coupling end and a connection end. The connection end has an outer surface sized for a clearance fit with the inner surface within the hollow bore of the first shaft. The outer surface has a plurality of radially outwardly extending male splines extending generally parallel to the axis of the second shaft. The male splines are configured for an interdigitated fit with the female splines, with the interdigitated fit establishing a generally uniform, serpentine clearance gap between the male splines and the female spines. The I-shaft assembly further includes a polymeric material extending into the clearance gap and extending into the at least one through opening, wherein the polymeric material reliably fixes the first shaft to the second shaft in an economical, robust and durable fashion, while also preventing the ingress of contamination, such as fluid, dirt and debris through a joint seam between the first and second shafts, thereby minimizing the onset of corrosion inside the I-shaft assembly and providing the I-shaft assembly with a long and useful life.

In accordance with another aspect of the disclosure, the outer surface of the second shaft can be provided having a first annular groove, with the polymeric material extending into the first annular groove to enhance axial and torsional fixation between the first and second shafts to prevent relative axial movement and rotation therebetween.

In accordance with another aspect of the disclosure, the male splines can be formed to extend axially from opposite sides of said first annular groove to enhance torsional fixation between the first and second shafts to prevent relative rotation therebetween.

In accordance with another aspect of the disclosure, the first tubular wall portion can be provided having a plurality of said at least one through opening, with the polymeric material extending into the plurality of through openings to further yet enhance axial and torsional fixation between the first and second shafts.

In accordance with another aspect of the disclosure, the outer surface of the second shaft can be provided having at least one circumferentially extending second groove, with at least a portion of the first tubular wall portion of the first shaft extending into the second groove to further yet enhance axial and torsional fixation between the first and second shafts.

In accordance with another aspect of the disclosure, the outer surface of the second shaft can be providing having a plurality of the circumferentially extending second grooves, at least a portion of the first tubular wall portion of the first shaft extending into the plurality of the circumferentially extending second grooves.

In accordance with another aspect of the disclosure, the polymeric material can be formed to extend outwardly from the hollow bore through the first end of the first shaft to seal off an annular seam between the first end of the first shaft and the outer surface of the connection end of the second shaft, thereby enhancing the protection against the ingress of contamination into the joint between the first and second shafts, thus inhibiting the onset of corrosion and extending the useful life of the I-shaft.

In accordance with another aspect of the disclosure, the polymeric material can be formed to extend annularly about the connection end of the second shaft from the first annular groove of the second shaft outwardly from the hollow bore through the first end of the first shaft, thereby forming an annular fluid tight seal between the inner surface of the first shaft and the outer surface of the connection end of the second shaft from the first annular groove of the second shaft to the first end of the first shaft.

In accordance with another aspect of the disclosure, the polymeric material can be provided as a plastic, and can be injected to a predetermined pressure to ensure complete filling of the gap between the female and male splines, thereby maximizing the fixation between the first and second shafts and maximizing the protection against the ingress of contamination into the joint between the first and second shafts.

In accordance with another aspect of the disclosure, the first shaft can be provided having a second tubular wall portion with an inner surface bounding a hollow bore extending into the second end, with the inner surface of the second tubular wall portion having a plurality of radially inwardly extending female splines extending generally parallel to the axis of the first shaft and with the second tubular wall portion having at least one through opening. A third shaft can be provided extending along an axis between a coupling end and a connection end, with the connection end of the third shaft having an outer surface sized for a clearance fit within the hollow bore of the second tubular wall portion. The outer surface of the third shaft can be provided having a plurality of radially outwardly extending male splines extending generally parallel to the axis of the third shaft. The male splines of the third shaft can be configured for an interdigitated fit with the female splines of the second tubular wall portion, with the interdigitated fit establishing a clearance gap between the male splines of the third shaft and the female spines of the second tubular wall portion. A polymeric material can be provided to fill the clearance gap between the male splines of the third shaft and the female spines of the second tubular wall portion and to extend into the at least one through opening of the second tubular wall portion.

In accordance with another aspect of the disclosure, a method of assembling an intermediate shaft assembly is provided. The method includes providing a first shaft extending along an axis between a first end and a second end with the first shaft having a first tubular wall portion having an inner surface bounding a hollow bore extending into the first end, with the inner surface having a plurality of radially inwardly extending female splines extending generally parallel to the axis and the first tubular wall portion having at least one through opening. Further, providing a second shaft extending along an axis between a coupling end and a connection end with the connection end having an outer surface having a plurality of radially outwardly extending male splines extending generally parallel to the axis. Further yet, inserting the connection end of the second shaft in a clearance fit within the hollow bore of the first shaft and interdigitating the male splines with the female splines and establishing a clearance gap between the male splines and the female spines. Then, filling at least a portion or the entirety of the clearance gap with a polymeric material and extending the polymeric material into the at least one through opening.

In accordance with another aspect of the disclosure, the method can further include filling the clearance gap with the polymeric material by injecting the polymeric material through the at least one through opening.

In accordance with another aspect of the disclosure, the method can further include providing the outer surface of the second shaft having a first annular groove and filling the first groove at least partially or entirely with the polymeric material.

In accordance with another aspect of the disclosure, the method can further include providing the outer surface of the second shaft having at least one circumferentially extending second groove and deforming at least a portion of the first tubular wall portion of the first shaft to extend into the second annular groove.

In accordance with another aspect of the disclosure, the method can further include providing the outer surface of the second shaft having a plurality of the circumferentially extending second grooves and deforming at least a portion of the first tubular wall portion of the first shaft to extend into the second annular grooves.

In accordance with another aspect of the disclosure, the method can further include causing the polymeric material to extend outwardly from the hollow bore to seal off an annular seam between the first end of the first shaft and the second shaft.

In accordance with another aspect of the disclosure, the method can further include filling the clearance gap with the polymeric material to a predetermined pressure.

These and other objects, advantages and features will become more apparent to one possessing ordinary skill in the art from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
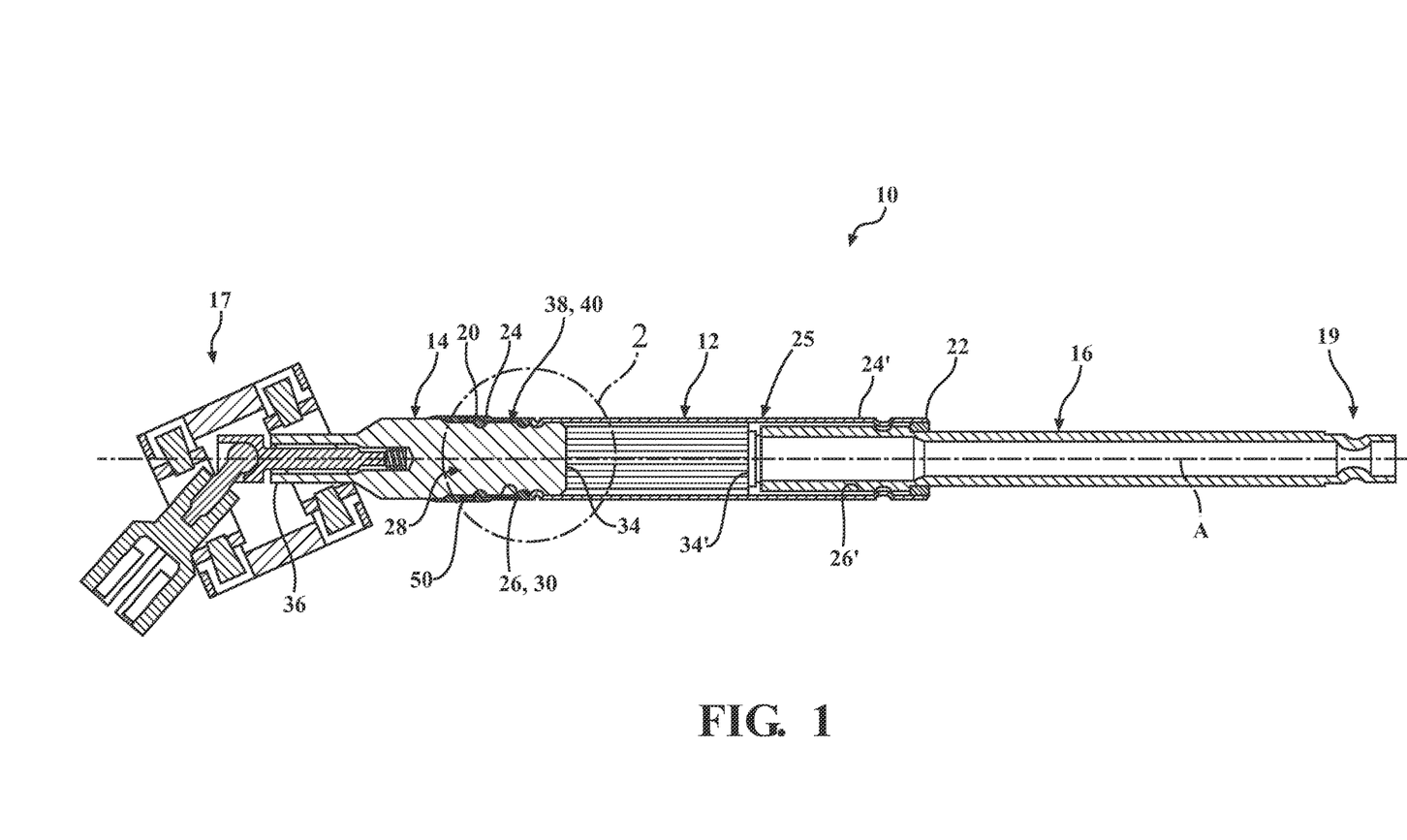
FIG. 1 is an assembled view of an I-shaft assembly in accordance with one aspect of the invention.

Referring now to the Figures, where the invention will be described with reference to specific embodiments, without limiting same, FIG. 1 illustrates an exemplary intermediate shaft (I-shaft) assembly 10 that generally includes, by way of example and without limitation, a first shaft 12, a second shaft 14, and a third shaft 16 fixedly attached to one another against relative axial movement and against relative rotation with one another during normal use. In the exemplary embodiment, I-shaft assembly 10 is configured for use in a vehicle steering column assembly (not shown), having a universal joint (U-joint) or constant velocity joint (CV) joint 17 at a coupling end of the second shaft 14 configured for coupled attachment to a steering rack or gear (not shown) and a yoke or member 19 at a coupling end of third shaft 16 configured for coupled attachment to a steering wheel assembly (not shown). However, it is to be recognized that the shaft assembly 10 described herein may be used in any other suitable system.

Figure 2:
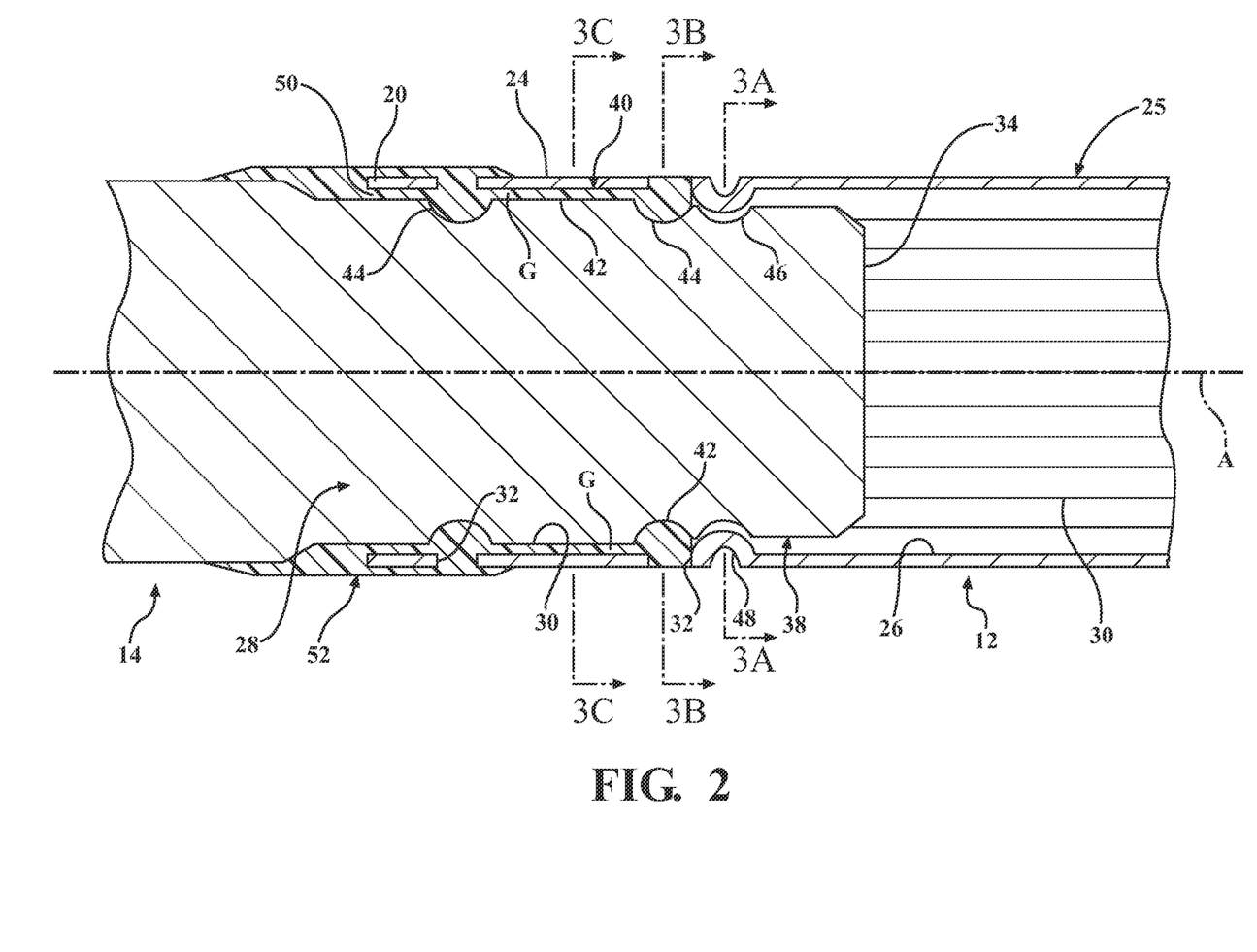
FIG. 2 is a cross-sectional view taken generally along a central longitudinal axis of the I-shaft assembly shown in FIG. 1 of an encircled portion 2.

FIG. 2 illustrates an enlarged cross-sectional view taken generally along a central longitudinal axis A of the I-shaft assembly shown in FIG. 1, with the portion being an encircled portion in FIG. 1 identified by reference number 2. The central longitudinal axis A is a common central longitudinal axis for each of the first shaft 12, the second shaft 14 and the third shaft 16, such the respective shafts 12, 14, 16 are coaxially aligned with one another.

The first shaft 12 is shown extending along the axis A between an open first end 20 and an open second end 22. The first shaft 12 has a first tubular wall portion 24 with a cylindrically straight, smooth outer surface 25, by way of example and without limitation, and an inner surface 26 bounding a hollow bore 28 extending into the first end 20. In the embodiment shown, by way of example and without limitation, the first shaft 12 is a purely tubular member, having a constant geometric shape along its length, such as can be readily extruded, such that the hollow bore 28 extends from the first end 20 to the second end 22. As such, the first shaft 12 is shown having a second tubular wall portion 24' with an inner surface 26' bounding the hollow bore 28 extending into the second end 22. For sake of simplicity, the description hereafter is directed to a fixed connection between the first end 20 of the first shaft 12 and the second shaft 14, with it to be recognized that a fixed connection between the second end 22 of the first shaft 12 and the third shaft 16 can be formed in the same manner. The inner surface 26 has a plurality of radially inwardly extending female splines 30 extending generally parallel to the axis A, and the first tubular wall portion 24 has at least one through opening 32. The illustrated exemplary embodiment is shown having a plurality of the through openings 32, with a first pair of diametrically opposite through openings 32 being axially spaced from a second pair of diametrically opposite through openings 32, by way of example and without limitation.

The second shaft 14 extends along the axis A between a connection end 34 and a coupling end 36 (fixed to U-joint 17). The connection end 34 of the second shaft 14 has an outer surface 38 sized for a clearance fit within the hollow bore 28 of the first shaft 12, thereby doing away with any difficulty issues encountered with interference fits, and also providing for relatively loose tolerances between the first 12 and second 14 shafts, thus reducing cost associated with the manufacture and assembly thereof. The outer surface 38 has a plurality of radially outwardly extending male splines 40 extending generally parallel to the axis A of the second shaft 14. The male splines 40 are configured for an interdigitated loose fit with the female splines 30, with the interdigitated fit establishing a generally uniform, serpentine clearance gap G between the male splines 40 and the female spines 30.

Given the aforementioned fixed connection is can be the same between the first shaft 12 and the third shaft 16, it is to be recognized that a connection end 34' of the third shaft 16 can be configured in the same manner as described for the connection end 34 of the second shaft 14.

Figure 3A:
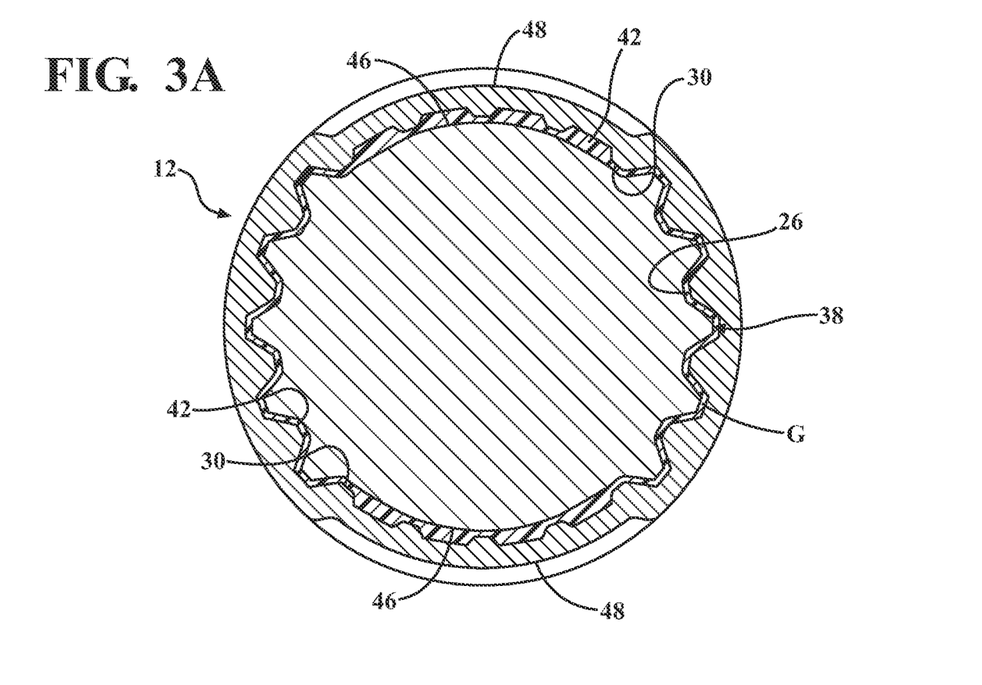
FIG. 3A is a cross-sectional view taken generally along the section line 3A-3A of FIG. 2.
Figure 3B:
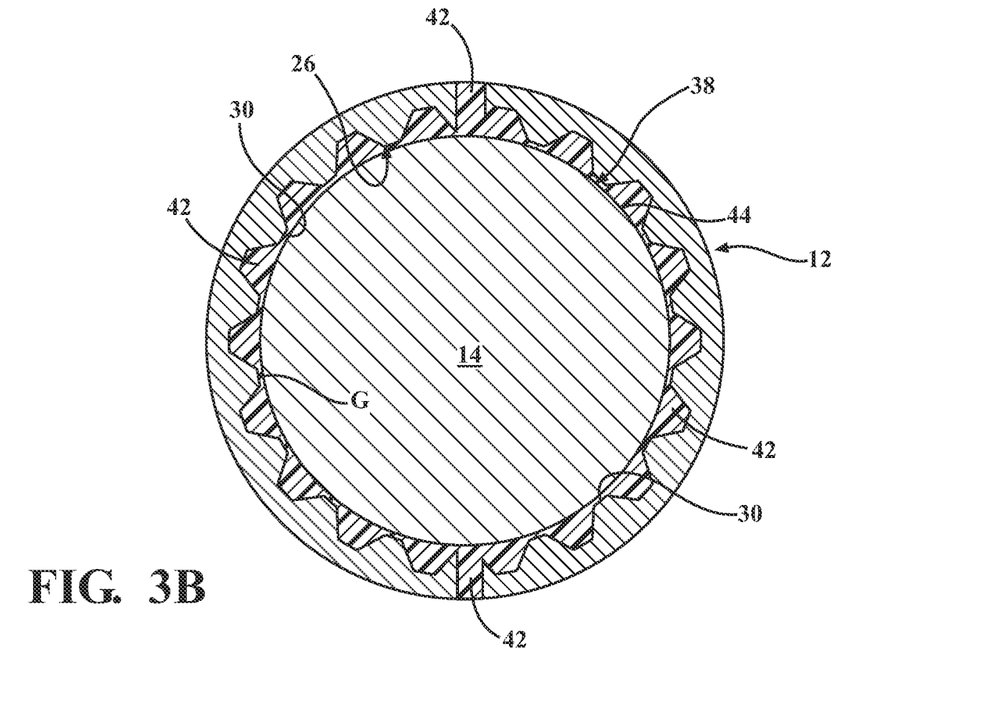
FIG. 3B is a cross-sectional view taken generally along the section line 3B-3B of FIG. 2.
Figure 3C:
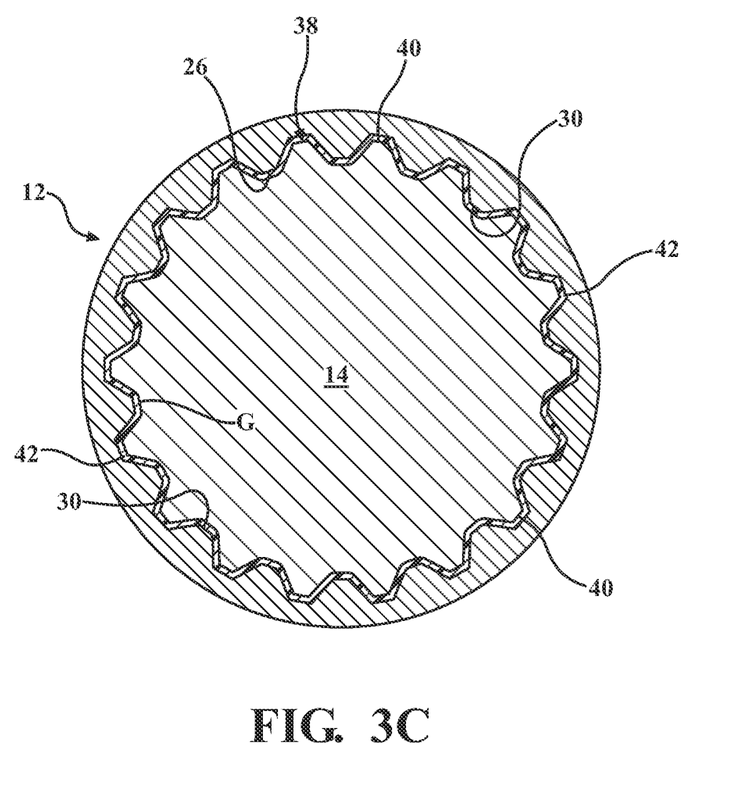
FIG. 3C is a cross-sectional view taken generally along the section line 3C-3C of FIG. 2.

The I-shaft assembly 10 further includes a polymeric material 42 at least partially or completely filling the clearance gap G (FIG. 3C) and extending into the through openings 32 (FIG. 3B). The polymeric material 42 serves to reliably fix the first shaft 12 to the second shaft 14 in an economical, robust and durable fashion, while also preventing the ingress of contamination, such as fluid, dirt and debris through a joint seam between the first and second shafts, thereby providing the I-shaft with a long and useful life. The polymeric material 42, as shown in FIG. 3, can extend in uninterrupted fashion about the entire circumference of the second shaft 14, thereby preventing metal-to-metal contact between the first and second shafts 12, 14 in the region of the interdigitated splines 30, 40, and thus, acting to dampen transmission of vibration therebetween. Of course, without unnecessary repetition, polymeric material 42 is also used to fix the first shaft 12 and the third shaft 16 to one another in the same fashion, as shown.

The outer surface 38 of the second shaft 14 can be provided having at least one circumferentially continuous first annular groove, shown as a plurality, and in particular, a pair of first annular grooves 44 spaced axially from one another. The polymeric material 42 at least partially or entirely fills the first annular grooves 44 to enhance axial and torsional fixation between the first 12 and second 14 shafts to prevent relative axial movement and rotation therebetween. The first annular grooves 44 can be formed to extend into the male spines 40, such that the male splines 40 extend away and outwardly from opposite sides of the first annular grooves 44 to enhance torsional fixation between the first 12 and second 14 shafts to prevent relative rotation therebetween.

The outer surface 38 can be further provided having at least one notch or circumferentially extending second groove 46, wherein the at least one second groove 46 can be provided as a plurality of circumferentially spaced second grooves 46, shown, by way of example and without limitation, as a pair of second grooves 46 extending in diametrically opposite, circumferentially spaced relation from one another. One skilled in the art will recognized other orientations, including the second groove(s) being a circumferentially continuous, annular groove. To further enhance the fixation of the first shaft 12 to the second shaft 14, a portion 48 of the first tubular wall portion 24 of the first shaft 12 can be deformed to extend into the second groove(s) 46, thereby forming deformed portions 48, to further yet enhance axial and torsional fixation between the first and second shafts. In the embodiment shown, the second grooves 46 are between the first annular groove 44 and the connection end 34. The deformed portion 48 can be mechanically upset to extend radially inwardly into locked relation within the second grooves 46, such as in a staking, swaging or rolling process, by way of example and without limitation.

In addition to the polymeric material 42 partially or completely filling the clearance gap G between the female splines 30 and the male splines 40, and partially or completely filling the first annular grooves 42, the polymeric material 42 can be formed to extend outwardly from the hollow bore 28 of the first shaft 12 to completely seal off a circumferentially continuous, annular joint region, referred to as seam 50, between the first end 20 of the first shaft 12 and the outer surface 38 of the second shaft 14. The polymeric material 42 is shown as forming thin layer 52, such as between about 0.01 mm to 0.5 mm thick, by way of example and without limitation, over the seam 50, though the polymeric material 42 can be formed flush with outer surfaces of the first 12 and second 14 shafts, if desired. As such, the protection against the ingress of contamination through the seam 50 into the joint region between the first 12 and second 14 shafts is optimized, thus inhibiting the onset of corrosion and extending the useful life of the I-shaft assembly 10.

The polymeric material 42 can be provided as any suitable polymeric material capable of being injected and solidified to form a rigid, strong, durable material, such as a plastic material. The polymeric material 42 can be injected, such as through one or more of the through openings 32, by way of example and without limitation, to a predetermined, measured pressure, whereupon reaching the predetermined pressure indicates and ensures an optimal, complete filling of the clearance gap G between the female 30 and male 40 splines, as well as a complete filling of the first annular grooves 44, thereby maximizing the fixation between the first 12 and second 14 shafts and maximizing the protection against the ingress of contamination through the seam 50 and into the joint between the first 12 and second 14 shafts.

In accordance with another aspect of the disclosure, a method of assembling an intermediate shaft assembly 10, such as describe above and illustrated in the Figures, is provided. The method includes providing a first shaft 12 extending along an axis A between a first end 20 and a second end 22 with the first shaft 12 having a first tubular wall portion 24 having an inner surface 26 bounding a hollow bore 28 extending into the first end 20, with the inner surface 26 having a plurality of radially inwardly extending female splines 30 extending generally parallel to the axis A, and the first tubular wall portion 24 having at least one through opening 32. Further, providing a second shaft 14 extending along an axis A between a coupling end 36 and a connection end 34, with the connection end 34 having an outer surface 38 having a plurality of radially outwardly extending male splines 40 extending generally parallel (generally parallel is intended to mean that a slight deviation from true parallel could exist, such as by about a few degrees or less) or truly parallel to the axis A. Further yet, inserting the connection end 34 of the second shaft 14 in a clearance fit within the hollow bore 28 of the first shaft 12, while aligning and maintaining the second shaft 14 in coaxial alignment with the first shaft 12, and interdigitating the male splines 40 with the female splines 30 and establishing a generally uniform clearance gap G between the male splines 40 and the female spines 30. Then, at least partially or completely filling the clearance gap G with a polymeric material 42 and extending the polymeric material 42 into the at least one through opening 32.

In accordance with another aspect of the disclosure, the method can further include at least partially or completely filling the clearance gap G with the polymeric material 42 by injecting the polymeric material 42 under pressure through the at least one of the through openings 32.

In accordance with another aspect of the disclosure, the method can further include providing the outer surface 38 of the second shaft 14 having at least one circumferentially extending first groove 44 and at least partially or completely filling the at least one circumferentially extending first groove 44 with the polymeric material 42.

In accordance with another aspect of the disclosure, the method can further include providing the outer surface 38 of the second shaft 14 having at least one notch or circumferentially extending second groove 46, wherein the at least one second groove 46 can be provided as a plurality of circumferentially spaced second grooves 46, and deforming at least a portion of the first tubular wall portion 24 of the first shaft 12 to extend radially inwardly into fixed relation within the at least one second groove 46.

In accordance with another aspect of the disclosure, the method can further include causing the polymeric material 42 to extend outwardly from the hollow bore 28 to seal off an annular seam 50 between the first end 20 of the first shaft 12 and the outer surface 38 of the second shaft 14.

In accordance with another aspect of the disclosure, the method can further include completely filling the clearance gap G with the polymeric material 42 to a predetermined pressure by monitoring and regulating the pressure of the polymeric material 42 as it is being injected.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. An intermediate shaft assembly, comprising:
    a first shaft extending along an axis between a first end and a second end, said first shaft having a first tubular wall portion with an inner surface bounding a hollow bore extending into said first end, said inner surface having a plurality of radially inwardly extending female splines and said first tubular wall portion having at least one through opening;
    a second shaft extending along said axis between a coupling end and a connection end, said connection end having an outer surface sized for a clearance fit with said inner surface bounding said hollow bore of said first shaft, said outer surface having a plurality of radially outwardly extending male splines configured for an interdigitated fit with said female splines, said interdigitated fit establishing a clearance gap between said male splines and said female spines; and
    a polymeric material at least partially filling said clearance gap and extending into said at least one through opening,
    wherein said outer surface of said second shaft has a first annular groove, said polymeric material extending into said first annular groove,
    wherein said polymeric material extends annularly about said outer surface of said connection end from said first annular groove outwardly from said hollow bore through said first end to seal off an annular seam between said first end and said outer surface of said connection end of said second shaft.

2. The intermediate shaft assembly of claim 1, wherein said plurality of radially inwardly extending female splines and said plurality of radially outwardly extending male splines extend generally parallel to said axis.

3. The intermediate shaft assembly of claim 1, wherein said male splines extend axially away from opposite sides of said first annular groove.

4. The intermediate shaft assembly of claim 1, wherein said first tubular wall portion has a plurality of said at least one through opening, said polymeric material extending into said plurality of through openings.

5. The intermediate shaft assembly of claim 1, wherein said polymeric material is plastic.

6. An intermediate shaft assembly, comprising:
a first shaft extending along an axis between a first end and a second end, said first shaft having a first tubular wall portion with an inner surface bounding a hollow bore extending into said first end, said inner surface having a plurality of radially inwardly extending female splines and said first tubular wall portion having at least one through opening;
a second shaft extending along said axis between a coupling end and a connection end, said connection end having an outer surface sized for a clearance fit with said inner surface bounding said hollow bore of said first shaft, said outer surface having a plurality of radially outwardly extending male splines configured for an interdigitated fit with said female splines, said interdigitated fit establishing a clearance gap between said male splines and said female spines; and
a polymeric material at least partially filling said clearance gap and extending into said at least one through opening,
wherein said outer surface of said second shaft has at least one circumferentially extending groove, at least a portion of said first tubular wall portion of said first shaft extending into said at least one circumferentially extending groove.

7. The intermediate shaft assembly of claim 6, wherein said outer surface of said second shaft has a plurality of said circumferentially extending grooves.

8. The intermediate shaft assembly of claim 6, wherein said outer surface of said second shaft has a plurality of said circumferentially extending grooves, said polymeric material extending into at least one of said grooves.

9. An intermediate shaft assembly, comprising:
a first shaft extending along an axis between a first end and a second end, said first shaft having a first tubular wall portion with an inner surface bounding a hollow bore extending into said first end, said inner surface having a plurality of radially inwardly extending female splines and said first tubular wall portion having at least one through opening;
a second shaft extending along said axis between a coupling end and a connection end, said connection end having an outer surface sized for a clearance fit with said inner surface bounding said hollow bore of said first shaft, said outer surface having a plurality of radially outwardly extending male splines configured for an interdigitated fit with said female splines, said interdigitated fit establishing a clearance gap between said male splines and said female spines;
a polymeric material at least partially filling said clearance gap and extending into said at least one through opening,
wherein said first shaft has a second tubular wall portion with an inner surface bounding a hollow bore extending into said second end, said inner surface of said second tubular wall portion having a plurality of radially inwardly extending female splines extending generally parallel to said axis and said second tubular wall portion having at least one through opening, and further comprising:
a third shaft extending along an axis between a coupling end and a connection end, said connection end of said third shaft having an outer surface sized for a clearance fit with said inner surface within said hollow bore of said second tubular wall portion, said outer surface of said third shaft having a plurality of radially outwardly extending male splines extending generally parallel to said axis, said male splines of said third shaft being configured for an interdigitated fit with said female splines of said second tubular wall portion, said interdigitated fit establishing a clearance gap between said male splines of said third shaft and said female spines of said second tubular wall portion; and
a polymeric material filling said clearance gap between said male splines of said third shaft and said female spines of said second tubular wall portion and extending into said at least one through opening of said second tubular wall portion.

10. A method of assembling an intermediate shaft assembly, the method comprising:
providing a first shaft extending along a first axis between a first end and a second end with the first shaft having a first tubular wall portion having an inner surface bounding a hollow bore extending into the first end, with the inner surface having a plurality of radially inwardly extending female splines extending generally parallel to the first axis and the first tubular wall portion having at least one through opening;
providing a second shaft extending along a second axis between a coupling end and a connection end with the connection end having an outer surface having a plurality of radially outwardly extending male splines extending generally parallel to the second axis; and
inserting the connection end of the second shaft in a clearance fit within the hollow bore of the first shaft and interdigitating the male splines with the female splines and establishing a clearance gap between the male splines and the female spines;
filling at least a portion of the clearance gap with a polymeric material and causing the polymeric material to flow into the at least one through opening; and
providing the outer surface of the second shaft having at least one circumferentially extending groove and deforming at least a portion of the first tubular wall portion of the first shaft to extend into the groove.

11. The method of claim 10, further including filling the clearance gap with the polymeric material by injecting the polymeric material through the at least one through opening.

12. The method of claim 10, further including providing the outer surface of the second shaft having a plurality of said circumferentially extending grooves and filling at least one of the grooves with the polymeric material.

13. The method of claim 10, further including providing the outer surface of the second shaft having a plurality of said circumferentially extending grooves.

14. The method of claim 10, further including causing the polymeric material to extend outwardly from the hollow bore through the first end of the first shaft to seal off an annular seam between the first end of the first shaft and the outer surface of the connection end of the second shaft.

15. The method of claim 10, further including filling the clearance gap with the polymeric material to a predetermined pressure.

16. The method of claim 10, further including filling the clearance gap with the polymeric material in an injection molding process.

17. A method of assembling an intermediate shaft assembly, the method comprising:
- providing a first shaft extending along a first axis between a first end and a second end with the first shaft having a first tubular wall portion having an inner surface bounding a hollow bore extending into the first end, with the inner surface having a plurality of radially inwardly extending female splines extending generally parallel to the first axis and the first tubular wall portion having at least one through opening;
- providing a second shaft extending along a second axis between a coupling end and a connection end with the connection end having an outer surface having a plurality of radially outwardly extending male splines extending generally parallel to the second axis; and
- inserting the connection end of the second shaft in a clearance fit within the hollow bore of the first shaft and interdigitating the male splines with the female splines and establishing a clearance gap between the male splines and the female spines;
- filling at least a portion of the clearance gap with a polymeric material and causing the polymeric material to flow into the at least one through opening;
- providing the outer surface of the second shaft having an annular first groove and filling the first groove with the polymeric material; and
- further including causing the polymeric material to extend annularly about the outer surface of the connection end from the first annular groove outwardly from the hollow bore through the first end to seal off an annular seam between the first end and the outer surface of the connection end of the second shaft.

* * * * *